(12) United States Patent
Anderson

(10) Patent No.: US 9,350,470 B1
(45) Date of Patent: May 24, 2016

(54) PHASE SLOPE REFERENCE ADAPTED FOR USE IN WIDEBAND PHASE SPECTRUM MEASUREMENTS

(71) Applicant: Keysight Technologies, Inc., Minneapolis, MN (US)

(72) Inventor: Keith F Anderson, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/634,638

(22) Filed: Feb. 27, 2015

(51) Int. Cl.
*H04L 7/00* (2006.01)
*H04B 17/21* (2015.01)

(52) U.S. Cl.
CPC .................................... *H04B 17/21* (2015.01)

(58) Field of Classification Search
CPC ...................................................... H04B 17/21
See application file for complete search history.

(56) References Cited

U.S. PATENT DOCUMENTS

| | | | |
|---|---|---|---|
| 4,301,536 A | 11/1981 | Favin et al. | |
| 8,891,639 B2 | 11/2014 | Vanden Boissche | |
| 2002/0176353 A1* | 11/2002 | Atlas | G10L 19/02 370/203 |
| 2008/0068236 A1* | 3/2008 | Sheba | G04F 10/005 341/118 |
| 2009/0041104 A1* | 2/2009 | Bogdan | H03K 5/15013 375/226 |
| 2013/0197848 A1* | 8/2013 | Sariaslani | G01R 29/26 702/111 |

FOREIGN PATENT DOCUMENTS

WO     2014/064453 A2     5/2014

OTHER PUBLICATIONS

Barich, Method and System for Performing Vector Spectral Measurements of a Radio Frequency (RF) Signal Having A Repetitive Waveform, U.S. Appl. No. 14/555,141, filed Nov. 26, 2014.
Verspecht, System and Method of Measuring Full Spectrum of Modulated Output Signal From Device Under Test, U.S. Appl. No. 14/341,383, filed Jul. 25, 2014.
Logio, et al., Phasor Angle Definition Suitable for Intermodulation Measurements, ARFTG Conference Digest, 2005, Spring 2005, 65th.

* cited by examiner

*Primary Examiner* — Dac Ha

(57) ABSTRACT

A method and apparatus for generating a normalized phase spectrum from a signal having a plurality of tones is disclosed. The apparatus includes a first receiver having a first signal port adapted to receive a first test signal having a first plurality of tones and a reference port adapted to receive a phase slope reference signal includes a reference tone and generates a sequence of digital values therefrom starting from a first time. The apparatus also includes a signal digitizer that digitizes the received first test signal to generate a sequence of digitized values of the received first test signal starting at the first time and a phase spectrum generator that generates a first normalized phase spectrum that is independent of the first time from the digitized values of the received first test signal and the received phase slope reference signal.

16 Claims, 5 Drawing Sheets

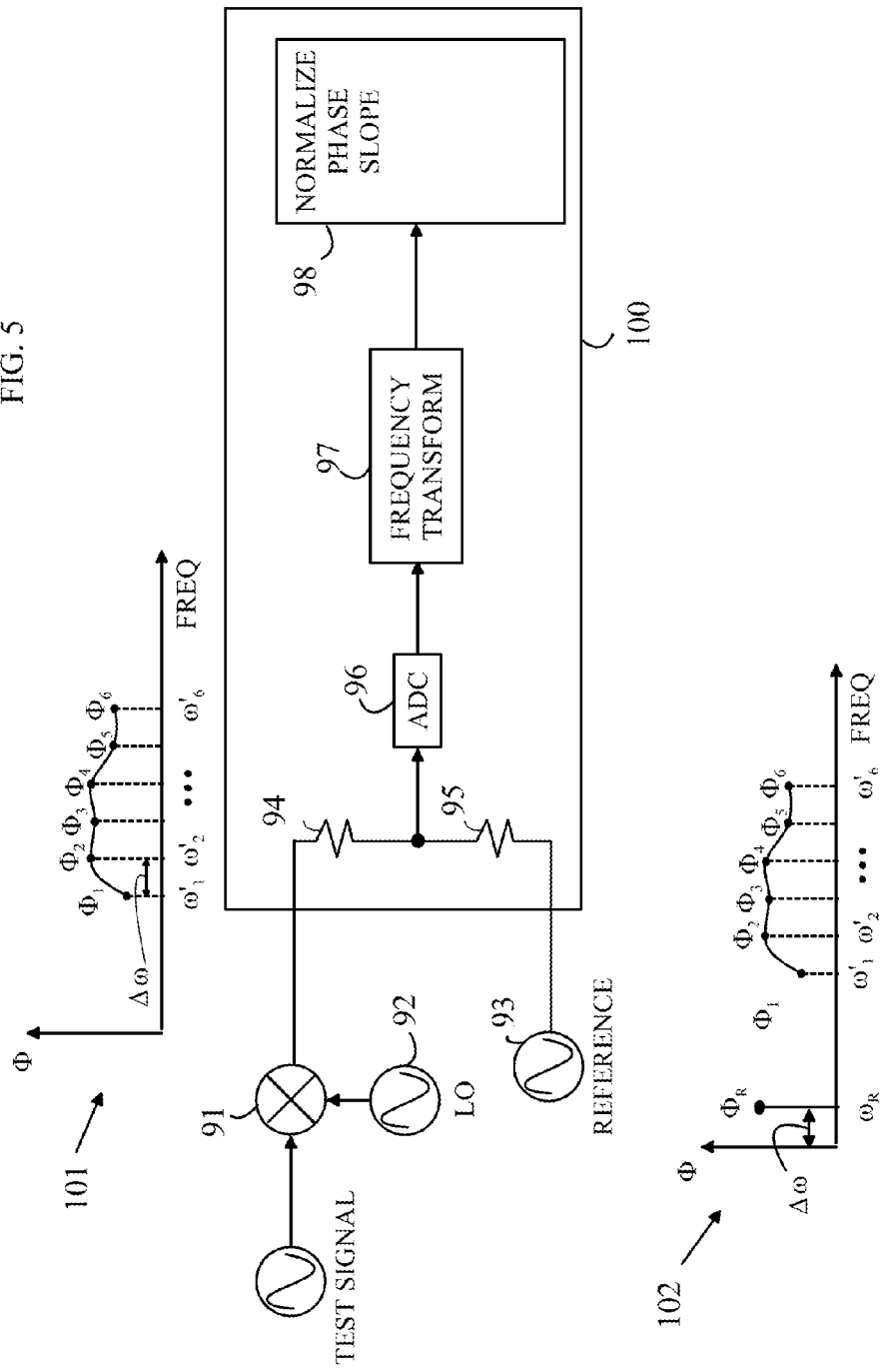

PHASE SLOPE REFERENCE ADAPTED FOR USE IN WIDEBAND PHASE SPECTRUM MEASUREMENTS

BACKGROUND

Many measurements of interest are generated by applying a repetitive signal to a device under test (DUT) and measuring the frequency response of the output of the DUT. In one common configuration, the output of the DUT is down converted in a mixer to an IF signal that is digitized by an analog-to-digital converter (ADC). The ADC output is then transformed using a FFT to provide a measurement of the amplitudes and phases of the tones in the output signal. The tones will be separated by a frequency that is determined by the repetition rate of the input signal. If the measurement is repeated, the amplitude of the tones and their frequencies will remain the same to within the experimental errors. Hence, spectra that depend only on the amplitude of the tones can be compared from time to time.

The phases of the tones as a function of frequency depend on the starting time of the sample sequence digitized by the ADC relative to some fixed starting point of the repetitive sequence. If this time changes, the phases as a function of frequency also change. Hence, comparing two phase measurements taken at different times presents significant challenges. For many measurements, it is the relationship between the phases as a function of frequency that is of interest. In these cases, normalization procedures are used to generate a set of normalized phases that are independent of the time the ADC sequence starts relative to the repetitive signal and in which the desired relationship can be examined.

However, there are measurements in which two different frequency spectra are measured at different times, and the problems associated with the phases of the tones cannot be easily overcome by a simple phase normalization process.

SUMMARY OF THE INVENTION

The present invention includes a method and apparatus for generating a normalized phase spectrum from a signal having a plurality of tones, the apparatus includes a first receiver having a first signal port adapted to receive a first test signal having a first plurality of tones and a reference port adapted to receive a phase slope reference signal including a reference tone and to generate a sequence of digital values therefrom starting from a first time. The apparatus also includes a signal digitizer that digitizes the received first test signal to generate a sequence of digitized values of the received first test signal starting at the first time and a phase spectrum generator that generates a first normalized phase spectrum that is independent of the first time from the digitized values of the received first test signal and the received phase slope reference signal.

In one aspect of the invention, the first plurality of tones in the first test signal includes a sequence of tones ordered by frequency, and each tone is separated from a neighboring tone in the sequence of tones by a frequency that is a rational multiple of the reference tone. The spacing between individual tones may be different. In another aspect of the invention, the rational multiple of the reference tone is an integer multiple of the reference tone. In yet another aspect of the invention, the tones are equally spaced in frequency having an inter-tone frequency equal to the reference tone.

In a still further aspect of the invention, the signal digitizer includes a first ADC that digitizes the signal from the signal port to form a first ordered sequence of signal values starting at the first time and a second ADC that digitizes a signal from the reference port to form a second ordered sequence of signal values starting at the first time. In one aspect of the invention, the phase spectrum generator transforms the first and second ordered sequences of signal values to first and second phase spectra, respectively. The first phase spectra includes a phase for each tone in the first test signal, and the second phase spectra includes a reference phase of a tone at the reference tone. The reference phase is used to normalize the phases of tones in the first phase spectrum.

In yet anther aspect of the invention, the signal digitizer adds the phase reference signal to the input signal prior to digitizing the first test signal.

In another aspect of the invention, the apparatus includes a numerically controlled oscillator connected to the reference port, the numerically controlled oscillator generating the sequence of digital values of the phase slope reference signal.

In yet another aspect of the invention, the apparatus includes a controller that causes the signal port to receive the first test signal that includes the first plurality of tones which includes a first highest tone and a first lowest tone, and causes the phase spectrum generator to generate the first normalized phase spectrum therefrom. The controller also causes the signal port to receive a second test signal which includes a second plurality of tones having a second highest tone and a second lowest tone, and causes the phase spectrum generator to generate a second normalized phase spectrum therefrom. The controller combines the first normalized phase spectrum with the second normalized phase spectrum to create a third normalized phase spectrum having a third lowest tone and a third highest tone, wherein the third lowest tone is equal to one of the first lowest tones and the second lowest tone and the third highest tone is equal to one of the first highest tones and the second highest tone.

In a still further aspect of the invention, the apparatus includes a second signal port adapted to receive a second test signal which includes a second plurality of tones, the signal digitizer digitizing the received second test signal starting at the first time, wherein, the phase spectrum generator generating a second normalized phase spectrum that is independent of the first time from the digitized values of the received second test signal and the received phase slope reference signal.

In another aspect of the invention, the apparatus includes a second receiver having a first signal port adapted to receive a first test signal which includes a first plurality of tones and a reference port adapted to receive a phase slope reference signal which includes a reference tone. The second receiver also includes a signal digitizer that digitizes the received first test signal and the phase slope reference signal starting at a second time and a phase spectrum generator that generates a first normalized phase spectrum that is independent of the second time from the digitized values of the received first test signal and the received phase slope reference signal. The first receiver is remote from the second receiver, and the phase slope reference signal of the first receiver is synchronized with the phase slope reference signal of the second receiver.

An apparatus according to the present invention can be used to measure properties of a DUT. In one measurement method according to the present invention, a first phase slope reference signal that includes a reference tone is received and used to generate a first reference sequence of digital values from the first phase slope reference signal starting from a first time. The first reference sequence is transformed into a first reference phase spectrum. A first test sequence of digital values is generated from the test signal starting from the first time, and transformed into a first test phase spectrum. A first normalized test phase spectrum that is independent of the first time is generated from the first test phase spectrum and the first reference phase spectrum.

In one aspect of the invention, the first test signal is applied to a DUT and a second test signal includes a second plurality of tones which is received from the DUT. A second sequence of digital values starting at the first time is generated from the second test signal. A second normalized phase spectrum that is independent of the first time is generated from the digitized values of the received second test signal and the received first phase slope reference signal. A property of the DUT is then determined from the first and second normalized phase spectra.

In another aspect of the invention, the first test signal is applied to a DUT and a second test signal which includes a second plurality of tones is received from the DUT. A second sequence of digital values is generated from the second test signal starting at a second time from the second test signal, and a second reference sequence of digital values is generated from a second phase slope reference signal that includes the reference tone. A second normalized test phase spectrum is generated from the second sequence of digital values from the second test signal that is independent of the second time. The first and second phase slope reference signals are synchronized in time.

BRIEF DESCRIPTION OF THE DRAWINGS

FIG. 5 illustrates a receiver in which the phase slope reference signal is combined with the signal being measured.

DETAILED DESCRIPTION

Figure 1:
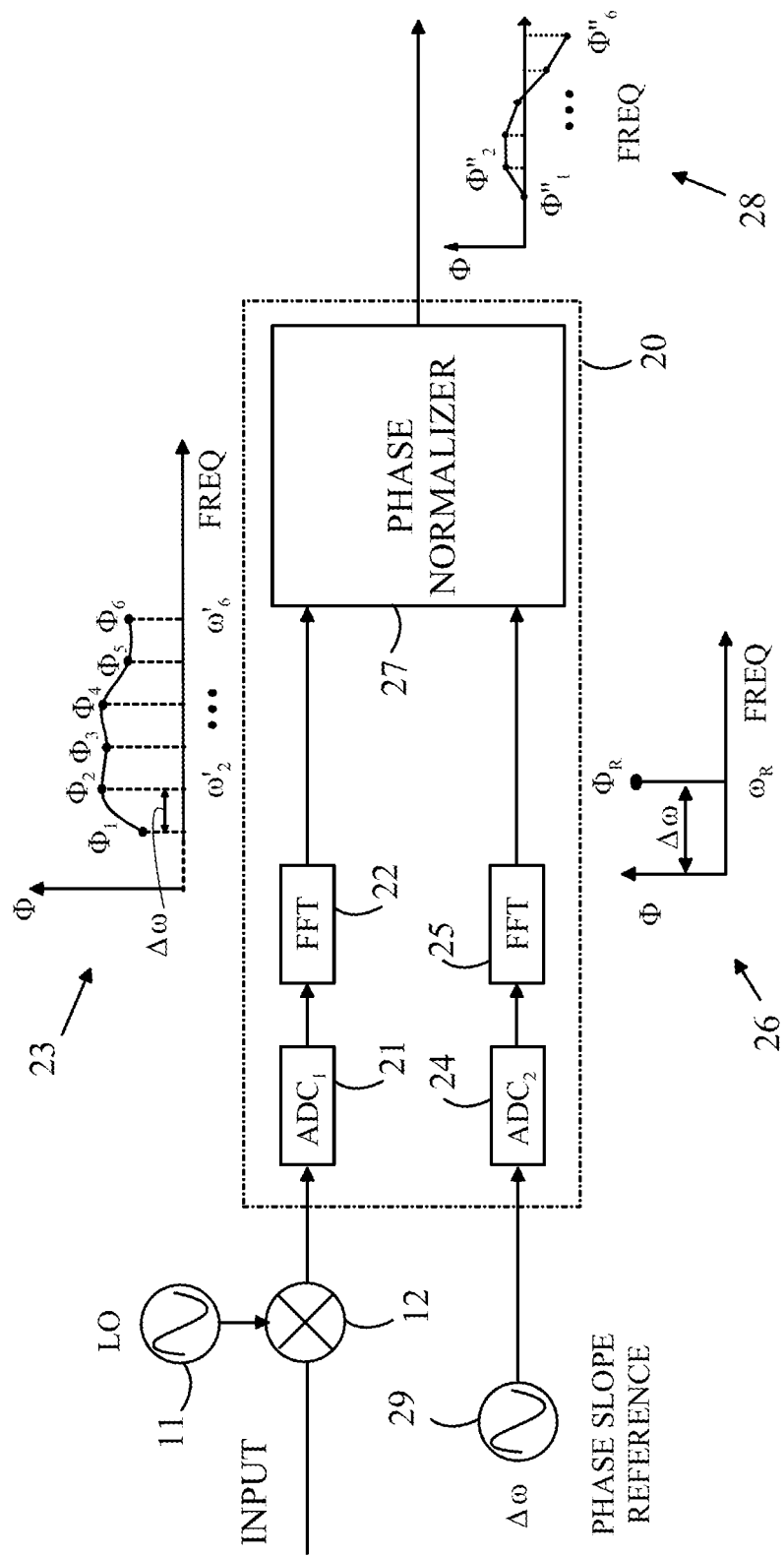
FIG. 1 illustrates a receiver that utilizes the phase normalization procedure of the present invention.

In many measurement systems, the goal is to characterize the effect of a DUT on an input signal. To accomplish such tests, a repetitive signal is input to the DUT and the amplitude and phase of the component frequencies in the input signal are measured at the output of the DUT. A test that involves measuring the alteration of the phase of each input tone by the DUT presents significant challenges unless the input signal and output signal from the DUT are measured at the same time. Any repetitive signal, $S(t)$, can be represented by a multi-tone signal of the form $$S(t) = A_0 + \Sigma A_k \cos(k\omega t + \theta_k)$$

where $A_k$ is the amplitude of the $k^{th}$ tone, $\theta_k$ is the phase of the $k^{th}$ tone and $k\omega$ is the frequency of that tone. Consider the case in which the t=0 point in time is moved. That is, define a new time, $t' = t - t_0$.

$$S(t') = A_0 + \sum A_k \cos(k\omega(t' + t_0) + \theta_k)$$
$$= A_0 + \sum A_k \cos(k\omega t' + k\omega t_0 + \theta_k)$$
$$= A_0 + \sum A_k \cos(k\omega t' + \Phi_k)$$

where $$\Phi_k = k\omega t_0 + \theta_k$$

Here, $\Phi_k$ is the phase in the new time system. From the equation above, it is clear that the amplitudes of the tones do not depend on the choice of the t=0 point in time, but the phases do. Consider the case in which all $\theta_k$ are 0. That is, in the original time coordinate system, $\theta$ as a function of k is 0. In the new coordinate system, the phases, $\Phi_k$ now are a linear function of k.

Consider a simple experiment in which $S(t)$ is applied to a DUT and the output of the DUT is analyzed by a receiver in which the output signal from the DUT is digitized to form a sequence of time samples that are then transformed by an FFT to obtain a spectrum having amplitudes and phases of the tones in the output signal. To simplify the discussion, it will be assumed that the input signal is chosen such that $\theta_k$ is 0 for all k and that all $A_k$ values are known. It will also be assumed that the output of the receiver is converted to a time signal of the form $$S'(t') = A'_0 + \Sigma A'_k \cos(k\omega t' + \Phi'_k)$$

Here, again, $t = t' - t_0$. Consider the case in which the phase change as a function of frequency that is introduced by the DUT is to be determined. Denote the DUT induced phase change in the $k^{th}$ tone by $Q_k$. Then, $$\Phi_k = k\omega t_0 + Q_k$$

Hence, even though $\theta_k$ is known and equal to 0, the value of $Q_k$ cannot be obtained from the receiver output unless $t_0$ is known or $\omega t_0$ is a multiple of 360 degrees. The quantity $\omega t_0$ is referred to as the phase slope in the following discussion. If the two signals are measured at the same time, then $t_0 = 0$. However, in many cases of interest, the value of to in the receiver is not known. That is, the time at which the first sample that is used in the Fourier transformed sequence is measured is not known relative to the time the input signal to the DUT had some predetermined phase.

For some measurements, the lack of knowledge with respect to $t_0$ does not prevent the information of interest from being obtained. For example, if the attenuation of the signal as a function of frequency is the goal, the output of the receiver together with a knowledge of the input signal amplitudes is sufficient. In some measurements, the goal is to determine the extent to which the $Q_k$ are constant as a function of k. In this case, a plot of the $\Phi_k$ as a function of k is sufficient. If the plot is a line, then the $Q_k$ were constant as a function of K.

Consider a series of measurements made in which $t_0$ is not known. Each set of measurements will have a different associated to value. Hence, $k\omega_0$ value for any given set of measurements will be different from that of every other set of measurements. This variation makes it difficult to gain insight into the values of the $Q_k$ between measurements. Accordingly, various schemes for converting the measured phases into "normalized" phases in which the variations due to the variations in to between measurements are suppressed have been put forward. In principle, the normalized phases as a function of frequency can then be compared to one another without the distortion introduced by the to term discussed above.

The normalization procedure has two parts. First, a phase value is subtracted from all of the phases. In one example, the value of $\Phi_1$ is subtracted from each of the measured phases, so that the first component of the normalized phases is always zero. However, in other schemes, the phase at the mid point, last point, or the average of all phases, is subtracted.

Next, an approximation to $\omega t_0$ is computed from the measured phases. Note that in the simple case in which the $Q_k$ are constant, $\omega t_0$ is the slope of the $\Phi_k$ as a function of k. Denote this approximation by W. The normalized phases are obtained from the offset phases by subtracting a phase equal to $(k-1)W$ from the $k^{th}$ offset phase.

$$\Phi'_k = \Phi_k - \Phi_1$$

$$\Phi''_k = \Phi'_k - (k-1)*W$$

Here, the $\Phi'_k$ are offset phases, and the $\Phi''_k$ are the normalized phases. This procedure assumes that a good approximation to W can be obtained from the measured phases. If the variation of the $Q_k$ with k is relatively small, fitting the $\Phi_k$ to a straight line will provide a reasonable approximation to W, the slope of that line being W. However, in many cases of interest, that assumption is not valid.

The present invention overcomes this problem by utilizing a phase standard that provides a value of W that is relevant to the actual measurements that are made without relying on the measured values to deduce some approximation to W. The phase standard is provided by an oscillator having a frequency equal to that of the spacing between the tones in the input signal. The output of this oscillator is digitized at the same time as the input signal, and hence, the phase of the spectrum derived from this oscillator provides an accurate measure of W.

The manner in which a normalization procedure according to the present invention is accomplished can be more easily understood with reference to FIG. 1, which illustrates a receiver that utilizes the phase normalization procedure of the present invention. Receiver 20 processes two signals. The first signal is generated by a mixer 12 that down converts a periodic input signal using a local oscillator (LO) 11. To simplify the drawing, the bandpass filter between the mixer and the input to the receiver has been omitted from the drawing.

The output of mixer 12 is a series of tones having an inter-tone separation of $\Delta\omega$ which is determined by the period of the periodic input signal that is input to mixer 12. The output of mixer 12, after being appropriately filtered, is digitized by a first ADC 21 in receiver 20. The output of ADC 21 is then converted to a first frequency spectrum by FFT circuit 22. The phases as a function of frequency in the first frequency spectrum are shown at 23. To simplify the drawing, the amplitudes as a function of frequency have been omitted from the drawing.

Receiver 20 also includes a second input port that receives a signal from a reference oscillator that will be referred to as the phase slope reference in the following discussion. The phase slope reference source consists of an oscillator having a frequency $\Delta\omega$. The output of phase slope reference 29 is digitized by a second ADC 24 and transformed to a second frequency spectrum by FFT circuit 25 to produce a second frequency spectrum having a single amplitude and phase, $\Phi_R$, shown at 26. Again, the amplitude of the spectral component in the second spectrum has been omitted. The output of FFT circuit 25 is then used by phase normalizer 27 to normalize the phases in spectrum 23 to generate a normalized spectrum whose phases are normalized according to the procedure discussed below. The normalized phases of the normalized spectrum are shown at 28. Again, the amplitudes of the normalized spectrum have been omitted to simplify the drawing. However, the amplitudes of the normalized spectrum are the same as the amplitudes of the spectrum generated by FFT circuit 22.

It should be noted that ADC 21 and ADC 24 operate on the same clock, and hence, the spectra created by converting the output of each ADC have the same phase term $\omega t_0$ discussed above. That is, $\Phi_R = \omega t_0$ for the spectrum generated by FFT circuit 22. Phase normalizer 27 then uses this known value of $\omega t_0$ to normalize the phases of the spectrum generated by FFT circuit 22 in a manner analogous to the phase normalization procedure discussed above, namely:

$$\Phi'_k = \Phi_k - \Phi_1$$

$$\Phi''_k = \Phi'_k - (k-1)*\Phi_R$$

The normalized phases generated by receiver 20 will be the same on repeated measurements made at different times, since the variations in starting times are captured by the processing of the phase slope reference. It should be noted that the first normalized phase is set to have a zero phase. However, in principle, any fixed phase could be used for the first normalized phase.

The manner in which a phase normalizer according to the present invention can be used to improve a number of measurements that depend on phase measurements taken at different times will now be discussed in more detail.

The present invention provides significant improvements in systems that utilize "stitching" to piece together a spectrum for a test signal that has much greater bandwidth than that of the receiver. Consider a case in which the input to mixer 12 shown in FIG. 1 has a bandwidth that is much larger than the bandwidth of receiver 20. For example, the input signal could have a bandwidth of 100 MHz while FFT circuit 22 can only generate a signal having a bandwidth of 20 MHz. The goal of the receiver is to generate a spectrum covering the entire 100 MHz range from the component measured 20 MHz spectra. In conventional analyzers, the receiver would measure six or more overlapping spectra by varying the frequency of LO 11. Each component spectrum would have a bandwidth of 20 MHz and a frequency range that would partially overlap that of a neighboring component frequency. While combining the component amplitude spectra is straightforward, stitching together the phases to provide a phase as a function of frequency that could have been obtained from a single 100 MHz receiver presents significant challenges, because each component spectrum has a different W value with a different LO frequency which introduces another phase of offset.

In the prior art the component spectra overlap one another. The overlapped data is then used to calculate the relative phase offset and W values of the component spectra to achieve alignment. For example, the W value of component spectrum 2 may be adjusted until the overlap areas of component spectra 1 and 2 have the W value, then the offset of component spectrum 2 is adjusted until the overlap areas have the same average offset. The resulting concatenated signal may then be normalized as described previously to remove the random slope and offset inherent in these measurements.

One problem with this technique is that measurement noise can cause errors in the alignment. Phase offset errors are usually very small and are easy to minimize. However, errors in W can be large since they are very sensitive to the amount of frequency overlap and will accumulate over the stitching of multiple component spectra. To reduce the errors, the overlap areas must be very large, which increases the number of component spectra that must be utilized to span the desired frequency range.

Figure 2:
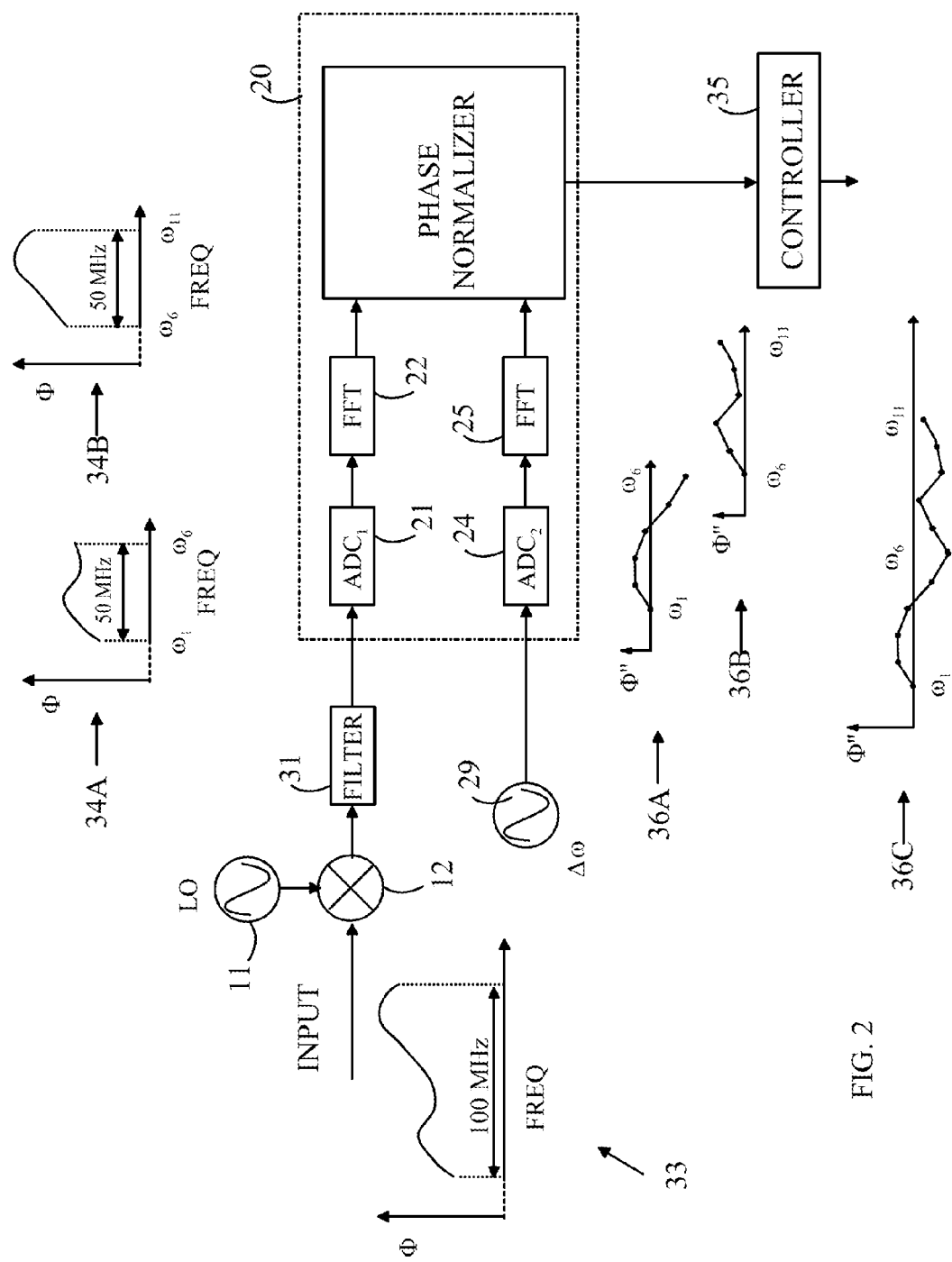
FIG. 2 illustrates the manner in which a phase normalization system according to the present invention can be used to perform a spectrum stitching measurement.

Refer now to FIG. 2, which illustrates the manner in which a phase normalization system according to the present invention can be used to perform a spectrum stitching measurement. To simplify the following discussion, the present example requires only two component spectra to provide a stitched spectrum; however, it will be apparent from this example that the procedure can be expanded to provide for stitching many more component spectra. Once again, the amplitude spectra have been omitted from the drawing; however, it is to be understood that there is a corresponding amplitude spectrum for each of the phase spectra discussed here.

For the purposes of this example, an input signal having a 100 MHz frequency band of interest is assumed as shown at 33. It will be assumed that there are 11 tones of interest, $\omega_1$ through $\omega_{11}$, in this input signal. This repetitive signal is input to mixer 12 which uses LO 11 and filter 31 to down convert the spectrum to a first component IF signal shown at 34A. The frequency of LO 11 is set by controller 35. Component spectrum 34A includes tones $\omega_1$ through $\omega_6$ and has a bandwidth of approximately 50 MHz. This IF signal is digitized by receiver 20 in the manner discussed above to generate a first normalized phase spectrum 36A spanning frequencies $\omega_1$ through $\omega_6$. Phase slope reference 29 is set to a frequency $\Delta\omega = \omega_1 - \omega_2$. After normalized phase spectrum 36A has been generated, controller 35 sets the frequency of LO 11 such that an IF spectrum spanning tones $\omega_6$ through $\omega_{11}$ is obtained as shown at 34B. A corresponding normalized phase spectrum 36B is obtained from receiver 20.

Controller 35 combines normalized spectra 36A and 36B to provide the stitched spectrum shown at 36C. The stitching operation consists of adding an offset phase equal to the difference in phase between the two $\omega_6$ components of 36A and 36B to each phase in normalized phase spectrum 36C. Hence, the only overlap in the component spectra required by the present invention is a small overlap that ensures that the tone at $\omega_6$ is present in both of the component spectra. While the above example only involved two component spectra, the same procedure can be used to stitch a third component spectra onto the already stitched first and second component spectra. The procedure merely involves setting LO 11 to select the third component spectrum, generating a third normalized phase spectrum for the third component spectrum, and then adding a phase offset equal to the phase of the last component in the already stitched normalized spectrum to each phase in the third normalized phase spectrum.

In the above-described embodiment, the higher tone segment is stitched to the lower tone segment. However, the order in which the two component signals are stitched can be varied. For example, the higher frequency signal can be kept as the growing component with each lower frequency segment being added to that component.

Figure 3:
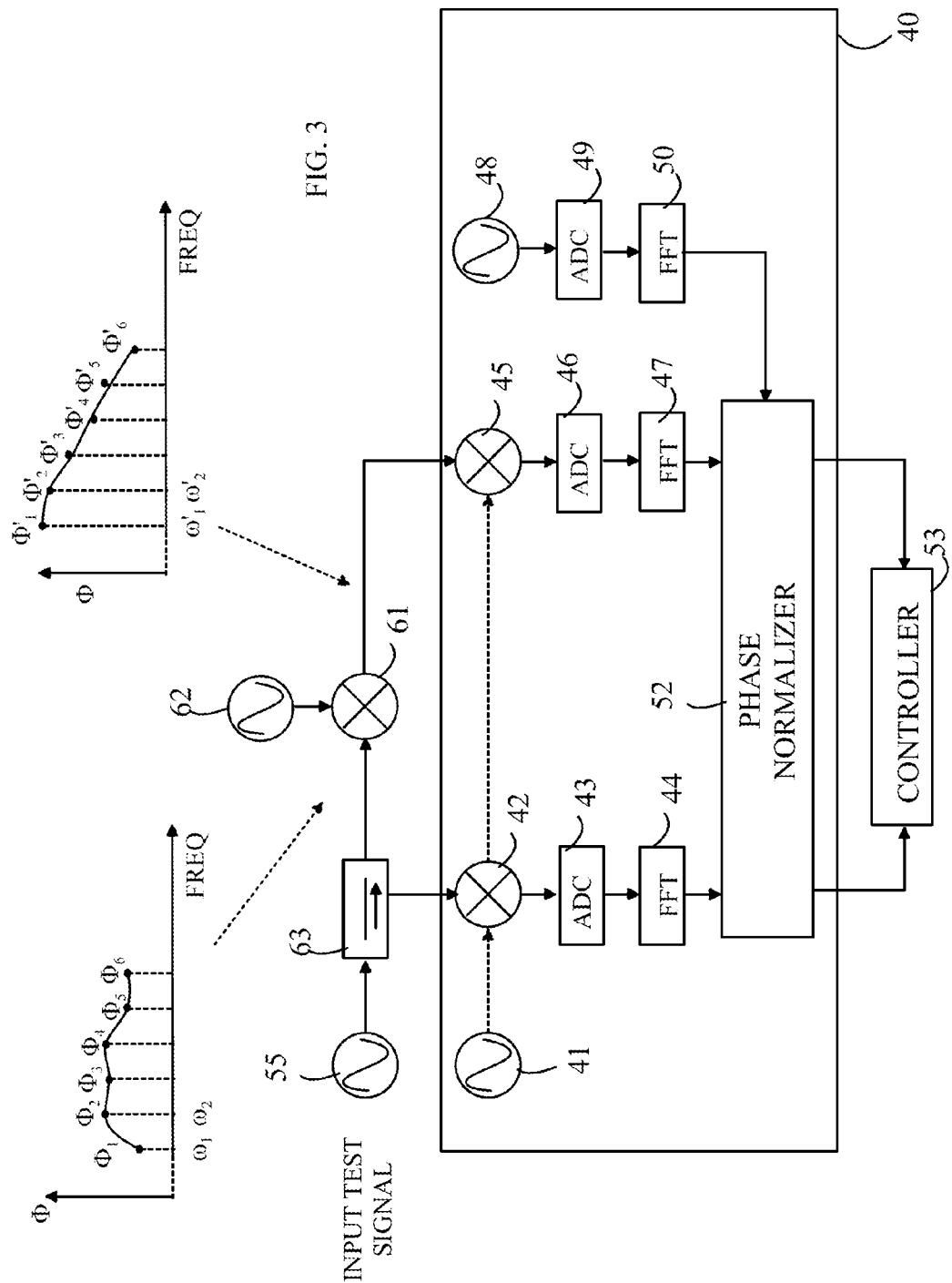
FIG. 3 illustrates another example of a receiver that utilizes the phase normalization method of the present invention.

The phase normalization system of the present invention depends only on the inter-tone spacing of the spectrum whose phases are to be normalized. The same phase slope reference can be used to normalize spectrums having different frequencies but the same inter-tone frequency. Refer now to FIG. 3, which illustrates another example of a receiver that utilizes the phase normalization method of the present invention. Receiver 40 is configured to provide data for characterizing a mixer 61. In this arrangement, a multi-tone test signal 55 is split by splitter 63 into a first signal that is input to mixer 61, the second signal is input to a port of receiver 40. An LO 62, which is controlled by controller 53, down converts this test signal to a second multi-tone signal having the same inter-tone spacing. This down-converted signal is input to a second port of receiver 40. The signal's input to the input ports of receiver 40 are converted using a single LO 41. The input signal from splitter 63 is down converted using mixer 42 whose output is digitized by ADC 43 and converted to a frequency spectrum by FFT 44. Similarly, the output from mixer 61 is down converted by mixer 45 to generate a second spectrum via ADC 46 and FFT 47.

To characterize mixer 61, the phases of the spectra generated by FFT 44 and FFT 47 are compared. However, these spectra have different phase slopes, and hence, comparing the two spectra presents challenges. These challenges can be overcome by using phase normalization of the spectra. However, as noted above, phase normalization systems that rely on the spectra to determine the phase slope are unreliable. The present invention overcomes this by using phase reference generator 48 whose output is digitized and converted to a phase slope reference by ADC 49 and FFT 50. Phase normalizer 52 operates in a manner analogous to phase normalizer 27 discussed above, but operates on two signals using the same phase slope reference. This phase reference provides the relevant phase slope and can be used with both spectra, since each spectrum has the same inter-tone spacing. Hence, controller 53 can now characterize mixer 61.

Figure 4:
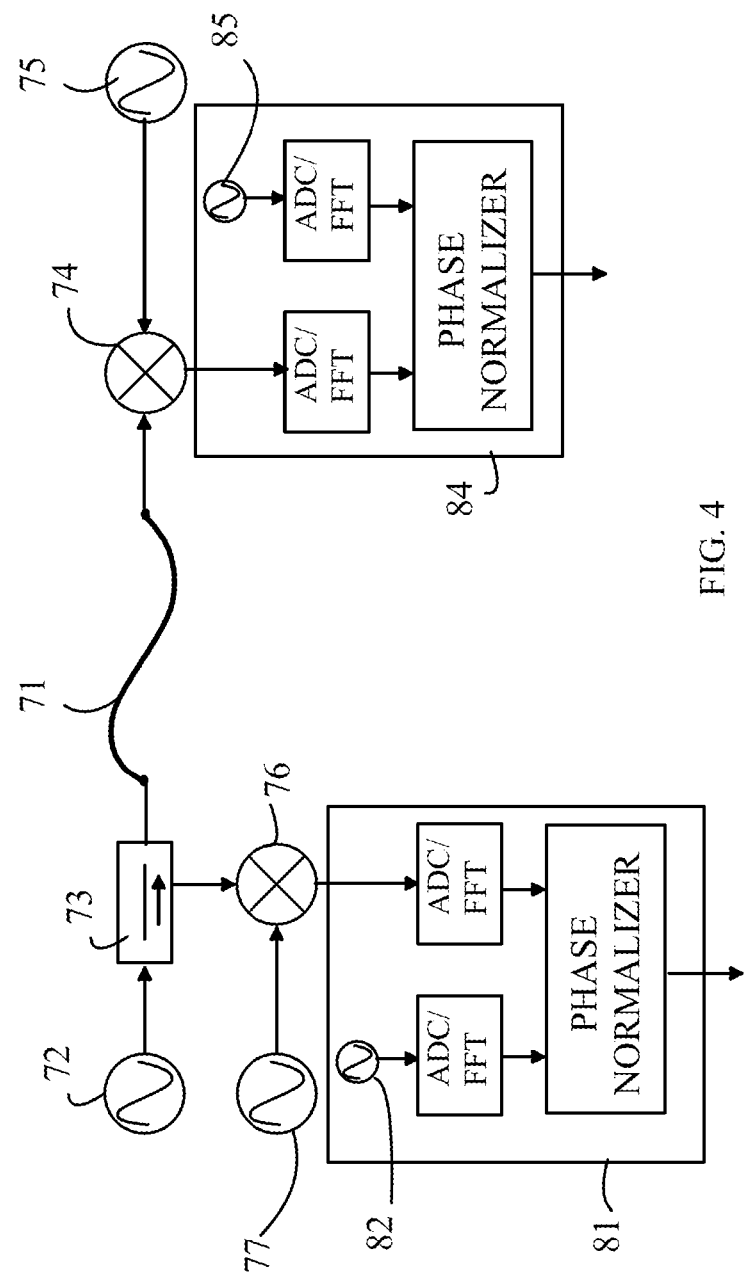
FIG. 4 illustrates the manner in which a long cable can be characterized utilizing the phase normalization procedure of the present invention.

Characterizing a long cable presents another technical problem in which two phase spectrums must be compared. In the case of a long cable or an antenna range, the test ports of the DUT are very far apart, and hence, measuring the transmission phase through the system requires a mechanism to synchronize two measurements at distant locations. Refer now to FIG. 4, which illustrates the manner in which a long cable 71 can be characterized utilizing the phase normalization procedure of the present invention. In this arrangement, an RF test signal 72 having a plurality of regularly spaced tones is split by a splitter 73. Part of the test signal is characterized locally using a receiver 81 after down converting the signal using mixer 76 and LO 77. The other part of the test signal is sent through cable 71 and down converted using mixer 74 and LO 75. The normalized phase spectrum of the signal at receiver 81 is generated using a local phase slope reference 82. Similarly, a normalized phase spectrum of the signal at receiver 84 is generated using a second local phase slope reference 85. In one aspect of the invention, the two phase slope references are synchronized. The time bases of the two receivers can be synchronized using the GPS system.

The system overcomes problems that have limited the prior art systems for characterizing long cables. First, creating an extremely wideband test signal, e.g. 20 GHz, for testing the cable presents significant challenges. Using the present invention, a source with a moderate bandwidth of tones having a plurality of tones can be used. A group of such tones can be stepped through the wideband of interest. The results are then stitched together on both sides of the cable by using the phase slope reference in a manner analogous to that described above with reference to stitching results at the receiver.

Measuring the electrical delay through the cable using prior art systems also presents significant challenges, since the transmitter and receiver did not share a common synchronous trigger. Here again, the transmitter and receiver make measurements at different times, hence, the delay of the DUT cannot be determined. If the input and output receiver measurements are normalized to the Phase Slope References, then the normalized measurements are time-independent. Hence, a synchronous trigger is not required between the transmitter and receiver. In the present invention, the system is calibrated by connecting the two receivers directly to each other, measuring the difference between the input and output phase plots, and using the result to normalize all future measurements.

In the above-described embodiments, the phase slope reference is shown as a physical oscillator. However, the phase slope reference need not be a physical source. For example, the phase slope reference could be implemented as a numerically controlled oscillator (NCO) in software. Using an NCO has a number of important advantages. An NCO is small, low noise, fast tuning, high resolution, low cost, wide bandwidth, and easy to reconfigure. An NCO can be configured to output digital values directly, and hence, a separate ADC is not needed.

In the above-described embodiments, the phase slope reference has a frequency equal to the inter-tone spacing in the test signal. However, other frequencies could be used. For optimal performance, the frequency of the phase slope reference should be chosen such the inter-tone frequency spacing is an integer multiple of the frequency of the phase slope reference.

In the above-described embodiments, the test signal was a multi-tone signal having equal spacing between the tones. However, the technique of the present invention will work as long as the spacing between any two frequencies in the test signal is a rational multiple of the phase slope reference. Integer multiples are preferred. The maximum phase shift between successive tones that can be resolved with an integer multiple is 360 degrees. If a non-integer rational multiplier is used the maximum phase shift that can be resolved is less than 360 degrees depending on the multiplier. For example, if the multiplier were 3/2, the maximum phase shift that could be resolved between successive tones would be 180 degrees. Hence, test signals in which the inter-tone spacing varies can be accommodated provided this limitation is met.

In the above-described embodiments, the signal from the phase slope reference is applied directly to an ADC to generate the phase slope. However, the phase slope reference signal may be passed through a heterodyned or homodyned receiver before being digitized. In addition, the test equipment using the present invention need not use a heterodyned or homodyned receiver.

In the above-described embodiments, the signal from the phase slope reference is applied to a separate ADC. However, embodiments in which the signal from the phase slope reference is combined with the IF test signal before the IF test signal is digitized can also be constructed, provided there is no tone in the IF test signal at the phase slope reference frequency. In this case, the phase of the tone at the phase slope reference frequency is the phase slope value for normalization.

Refer now to FIG. 5, which illustrates a receiver in which the phase slope reference signal is combined with the signal being measured. In this example, a test signal is down converted using mixer 91 and LO 92 to provide the signal to be measured by a receiver 100. The phase spectrum of the output of mixer 91 is shown at 101. The output of mixer 91 is added to the phase slope reference signal 93 using resistors 94 and 95. The phase spectrum of the signal entering ADC 96 is shown at 102. The summed signal is digitized using ADC 96 and transformed using a frequency transform 97 to provide an input signal to phase normalizer 98. Phase normalizer 98 uses the phase, $\Phi_R$ of the component at the reference frequency to normalize the phase spectrum to remove the dependence on the time the digital sequence started.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:
1. An apparatus comprising:
a first receiver comprising:
a first signal port adapted to receive a first test signal comprising a first plurality of tones;
a reference port adapted to receive a phase slope reference signal comprising a reference tone and to generate a sequence of digital values therefrom starting from a first time;
a signal digitizer that digitizes said first test signal to generate a sequence of digitized values of said received first test signal starting at said first time; and
a phase spectrum generator that generates a first normalized phase spectrum that is independent of said first time from said digitized values of said first test signal and said phase slope reference signal.

2. The apparatus of claim 1 wherein said first plurality of tones in said first test signal comprises a sequence of tones ordered by frequency, and wherein each tone is separated from a neighboring tone in said sequence of tones by a frequency that is a rational multiple of said reference tone.

3. The apparatus of claim 2 wherein said rational multiple of said reference tone is an integer multiple of said reference tone.

4. The apparatus of claim 2 wherein said sequence of tones are equally spaced in frequency having an inter-tone frequency equal to said reference tone.

5. The apparatus of claim 1 wherein said signal digitizer comprises a first ADC that digitizes said first test signal to form a first ordered sequence of signal values starting at said first time and a second ADC that digitizes said phase slope reference signal to form a second ordered sequence of signal values starting at said first time.

6. The apparatus of claim 5 wherein said phase spectrum generator transforms first and second ordered sequences of signal values to first and second phase spectra, respectively, said first phase spectrum comprising a phase for each tone in said first test signal, said second phase spectrum comprising a reference phase at said reference tone, said reference phase being used to normalize said first phase spectrum.

7. The apparatus of claim 1 wherein said signal digitizer adds said phase slope reference signal to first test signal prior to digitizing said first test signal.

8. The apparatus of claim 1 further comprising a numerically controlled oscillator connected to said reference port, said numerically controlled oscillator generating said sequence of digital values of said phase slope reference signal.

9. The apparatus of claim 1 further comprising a controller that causes said signal port to receive said first test signal comprising said first plurality of tones comprising a first highest tone and a first lowest tone, and causes said phase spectrum generator to generate said first normalized phase spectrum therefrom, said controller further causing said first signal port to receive a second test signal comprising a second plurality of tones having a second highest tone and a second lowest tone, causing said phase spectrum generator to generate a second normalized phase spectrum therefrom, wherein said controller combines said first normalized phase spectrum with said second normalized phase spectrum to create a third normalized phase spectrum having a third lowest tone and a third highest tone, wherein said third lowest tone is equal to one of said first lowest tone and said second lowest tone and said third highest tone is equal to one of said first highest tone and said second highest tone.

10. The apparatus of claim 1 further comprising a second signal port adapted to receive a second test signal comprising a second plurality of tones, said signal digitizer digitizing said received second test signal starting at said first time, wherein, said phase spectrum generator generating a second normalized phase spectrum that is independent of said first time from said digitized values of said received second test signal and said received phase slope reference signal.

11. The apparatus of claim 1 comprising a second receiver comprising
- a first signal port adapted to receive a first test signal comprising a first plurality of tones;
- a reference port adapted to receive a phase slope reference signal comprising a reference tone;
- a signal digitizer that digitizes said first test signal and said phase slope reference signal starting at a second time; and
- a phase spectrum generator that generates a first normalized phase spectrum that is independent of said second time from said digitized values of said received first test signal and said received phase slope reference signal, wherein
- said first receiver is remote from said second receiver and wherein said phase slope reference signal of said first receiver is synchronized with said phase slope reference signal of said second receiver.

12. A method for generating a normalized phase spectrum in a receiver for a test signal having a plurality of tones, said method comprising:
- receiving a first phase slope reference signal comprising a reference tone in said receiver:
- generating a first reference sequence of digital values from said first phase slope reference signal starting from a first time;
- transforming said first reference sequence to a first reference phase spectrum;
- generating a first test sequence of digital values from said test signal starting from said first time;
- transforming said first test sequence to a first test phase spectrum; and
- generating a first normalized test phase spectrum that is independent of said first time from said first test phase spectrum and said first reference phase spectrum.

13. The method of claim 12 wherein said plurality of tones in said test signal comprises a sequence of tones ordered by frequency, and wherein each tone is separated from a neighboring tone in said sequence of tones by a frequency that is a rational multiple of said reference tone.

14. The method of claim 12 wherein said test signal comprises a first plurality of tones comprising a first highest tone and a first lowest tone, and said first normalized phase spectrum comprises said first plurality of tones and wherein said method further comprises
- receiving a second test signal comprising a second plurality of tones having a second highest tone and a second lowest tone:
- generating a second normalized phase spectrum from said second test signal by generating a second test sequence of digital values from said second test signal starting at a second time and by generating a second reference sequence of digital values from said first phase slope reference signal starting at said second time; and
- combining said first normalized phase spectrum with said second normalized phase spectrum to create a third normalized phase spectrum having a third lowest tone and a third highest tone, wherein said third lowest tone is equal to one of said first lowest tones and said second lowest tone and said third highest tone is equal to one of said first highest tones and said second highest tone.

15. The method of claim 12 wherein said first test signal is applied to a device under test (DUT) and wherein said method further comprises:
- receiving a second test signal comprising a second plurality of tones from said DUT;
- generating a second sequence of digital values starting at said first time from said second test signal;
- generating a second normalized phase spectrum that is independent of said first time from said digitized values of said received second test signal and said received first phase slope reference signal; and
- determining a property of said DUT from said first and second normalized phase spectra.

16. The method of claim 12 wherein said first test signal is applied to a DUT and wherein said method further comprises:
- receiving a second test signal comprising a second plurality of tones from said DUT;
- generating a second sequence of digital values from said second test signal starting at a second time from said second test signal;
- generating a second reference sequence of digital values from a second phase slope reference signal comprising said reference tone; and
- generating a second normalized test phase spectrum from said second sequence of digital values from said second test signal that is independent of said second time, wherein said first and second phase slope reference signals are synchronized in time.

* * * * *